Patented Aug. 23, 1932

1,873,599

UNITED STATES PATENT OFFICE

HANS KAPPELER, OF BASEL, SWITZERLAND, ASSIGNOR TO SOCIETY OF CHEMICAL INDUSTRY IN BASLE, OF BASEL, SWITZERLAND

ALDEHYDE CONDENSATION PRODUCTS AND THE PROCESS OF MAKING SAME

No Drawing. Application filed May 31, 1930, Serial No. 458,896, and in Switzerland June 12, 1929.

This invention relates to new resinlike condensation products from furfural and it comprises the manufacture thereof, as well as the products themselves and their technical use. It is known that furfural is condensed by acids to black sandy masses which have no practical application because of their inferior mechanical properties.

I have found that valuable artificial masses may be obtained by condensing furfural in the presence or absence of a solvent or diluent and by means of an acid condensing agent with another aldehyde or mixture of aldehydes.

As aldehydes any aliphatic or aromatic aldehyde may be used, such as formaldehyde, acetaldehyde and their higher homologues; further crotonaldehyde, benzaldehyde and its homologues, etc.

The condensation may be carried out in one or in several stages; in the latter case the furfural is first caused to act with an aldehyde or mixture of aldehydes without a catalyst, whereupon the product formed is converted into the final product by addition of an acid condensing agent, in some cases with further addition of aldehyde.

The term "aldehyde" comprises also polymerization products of aldehydes, such as metaldehyde, paraldehyde, paraformaldehyde or the like.

The proportion of the components to each other may be varied within wide limits.

As condensing agents especially mineral acids, such as, for instance, hydrochloric acid, sulfuric acid, phosphoric acid or acid salts may be used.

As a rule, the reaction does not require external application of heat, but if desired it may be accelerated by heating.

The condensation products are black masses resembling ebonite and of considerable mechanical strength and marked chemical resistance. According to the proportion of solvent or diluent used in the condensation, the products are specifically lighter or heavier than water.

The condensation may be conducted wholly or in part in presence of a dyestuff, filling agent, softening agent, or the like, whereby the properties of the final product may be affected in various manners. It is also possible to treat the finished condensation product in the cold or at raised temperature, with inorganic or organic impregnating agents, which if necessary may be used in solution.

The following examples illustrate the invention:—

Example 1

20 parts by volume of commercial furfural are mixed with 10 parts by volume of acetaldehyde and 5 parts by volume of concentrated hydrochloric acid, and the mixture is poured into molds capable of being cooled. The temperature of the mixture should not substantially exceed about 20° C. It soon becomes brown-black and solidifies in the course of a couple of days to a homogeneous, solid mass, which is allowed to remain for some further days without further cooling, in order to complete the reaction.

The molded pieces are then removed from the molds and washed until they are free from acid. This operation occupies several days according to the thickness of the molded piece. The masses obtained are then cautiously dried, preferably first at a comparatively low temperature and then at a higher temperature.

In this manner deep black, infusible masses resembling ebonite, and having a lustrous surface, are obtained; they are insoluble in all usual solvents and even resist the action of acids and alkali solutions.

Instead of hydrochloric acid, other mineral acids may be used, such as sulfuric acid or hydrofluoric acid.

To the solution undergoing condensation may be added a dyestuff, a filling material, a softening agent or the like, whereby the properties of the final product may be influenced in various ways.

By treating the finished product with an impregnating agent, such as a drying oil or furfural, preferably at a raised temperature, properties, such as its strength and porosity, may be changed.

The still fluid solution undergoing condensation can be impregnated with many kinds of material, such as wood, paper or cellulose.

Example 2

15 parts by volume of crotonic aldehyde are mixed with 25 parts by volume of commercial furfural and 10 parts by volume of concentrated hydrochloric acid and the mixture is poured into a mold. The solidified mass is separated from the mold after some days and washed and dried as described in Example 1. The properties of the molded piece are similar to those described in Example 1.

Example 3

3 parts by volume of benzaldehyde are mixed with 10 parts by volume of furfural and 3 parts by volume of concentrated hydrochloric acid. The mixture is poured into a mold and allowed to remain therein for several days. The black jelly formed is then warmed on the water bath for a short time. After cooling down the hard lustrous mass is removed from the mold and further treated as in Example 1.

Example 4

6.5 parts by weight of paraldehyde are mixed with 18 parts by weight of furfural and 5 parts by weight of concentrated hydrochloric acid and the mixture is poured into a mold. The solution becomes dark and solidifies after some days to form a black mass, which is further treated as described in Example 1.

Instead of the paraldehyde, the same weight of metaldehyde or an equivalent quantity of para-formaldehyde may be used.

Example 5

10 parts by weight of furfural are mixed with 2.5 parts by weight of acetaldehyde, 4 parts by weight of formaldehyde solution of 36 per cent. strength and 10 parts by weight of concentrated hydrochloric acid. The mixture is poured into a mold and after some days solidifies to a mass which is further treated as described in Example 1 to produce a similar product.

Example 6

Equal parts of furfuramide and acetaldehyde are mixed together and there are added, while cooling well, and in portions, twice the weight of concentrated hydrochloric acid. Condensation occurs with separation of ammonium chloride and in a few days a solid black mass is formed which is further treated as described in Example 1.

Example 7

20 parts by volume of furfural and 10 parts by volume of acetaldehyde are mixed together and 5 parts by volume of sulfuric acid of 60 per cent. strength added thereto while cooling. The solution turns quickly greenish black. It is poured into molds and allowed to stand therein with some cooling. After an hour the content of the mold is viscous and after a day a hard black molded body is formed which is further treated as in Example 1 to produce a similar product.

Example 8

10 parts by volume of furfural are mixed with 5 parts by volume of acetaldehyde and 4 parts by weight of anhydrous phosphoric acid added thereto. The resulting liquid which gradually turns dark is allowed to stand for two days at ordinary temperature and then heated for about one hour in a water bath, whereupon it solidifies to a black gelatinous mass, which gradually gets hard and infusible. It is further worked up as described in Example 1.

What I claim is:—

1. A process for the manufacture of infusible black artificial masses by causing furfural to interact with other aldehydes in presence of a mineral acid condensing agent.

2. A process for the manufacture of infusible black artificial masses by causing furfural to interact with other aldehydes in presence of a mineral acid condensing agent until the liquid reaction mixture solidifies, then washing and drying the resulting infusible mass.

3. A process for the manufacture of infusible black artificial masses by causing furfural to interact with other aldehydes in presence of a mineral acid condensing agent, pouring the liquid reaction mixture into a mold and allowing it to solidify therein, whereupon the resulting molded product is washed and dried.

4. As new products black infusible artificial masses which can be obtained by the interaction of furfural with other aldehydes in presence of a mineral acid condensing agent, said bodies being insoluble in the usual resin solvents and even resist the action of acids and alkali solutions.

5. As new articles of manufacture the black molded bodies which can be obtained by the interaction of furfural with other aldehydes in presence of a mineral acid condensing agent, said bodies resembling ebonite, having a lustrous surface, being infusible and insoluble in the usual resin solvents and even resisting the action of acids and alkali solutions.

In witness whereof I have hereunto signed my name this 22nd day of May, 1930.

HANS KAPPELER.